(12) United States Patent
Choi et al.

(10) Patent No.: US 11,401,470 B2
(45) Date of Patent: Aug. 2, 2022

(54) PRODUCTION OF PETROLEUM PITCH

(71) Applicant: Saudi Arabian Oil Company, Dhahran (SA)

(72) Inventors: Ki-Hyouk Choi, Dhahran (SA); Ali Alnasir, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/877,820

(22) Filed: May 19, 2020

(65) Prior Publication Data

US 2021/0363428 A1   Nov. 25, 2021

(51) Int. Cl.
*C10C 3/02* (2006.01)
*B01D 3/06* (2006.01)
*B01D 19/00* (2006.01)

(52) U.S. Cl.
CPC ............. *C10C 3/02* (2013.01); *B01D 3/06* (2013.01); *B01D 19/0005* (2013.01)

(58) Field of Classification Search
CPC .. C10C 3/00; C10C 3/002; C10C 3/02; C10C 3/005
See application file for complete search history.

(56) References Cited

U.S. PATENT DOCUMENTS 3,928,170 A * 12/1975 Takahashi ............... C10C 3/002
                                                        208/40
4,209,500 A *  6/1980 Chwastiak ............. C10C 3/002
                                                        208/22
4,219,404 A *  8/1980 Dickakian ............... C10C 3/002
                                                        208/22
4,283,269 A *  8/1981 Greenwood ............. C10C 3/08
                                                        208/45
4,512,874 A *  4/1985 Watanabe ............... C10C 3/002
                                                        208/22

(Continued)

OTHER PUBLICATIONS

Kayukawa, Development of Supercritical Water Cracking Process to Upgrade Unconventional Extra Heavy Oil at Wellhead, Journal of the Japan Petroleum Institute, 60, (5), 241-247. (Year: 2017).*

(Continued)

*Primary Examiner* — Michelle Stein
(74) *Attorney, Agent, or Firm* — Bracewell LLP; Constance G. Rhebergen; Eleanor L. Tyson (57) ABSTRACT

A process to produce pitch, the process comprising the steps of introducing a depressurized effluent to a flash column; separating the depressurized effluent in the flash column to produce a liquid product; introducing the liquid product to a dweller; operating the dweller at a temperature between 350° C. and 500° C., a pressure between 0.1 psig and 10 psig, and a residence time between 30 minutes and 4 hours to produce a pitch stream and a reaction gas stream, wherein the dweller is a continuous stirred tank reactor (CSTR), wherein dehydrogenative polymerization reactions occur in the dweller to produce pitch, wherein the inert gas stream is operable to remove volatile components from the liquid product; removing a pitch stream from the dweller, wherein the pitch stream comprises the pitch; and removing a reaction gas stream, wherein the reaction gas stream comprises the volatile components and nitrogen.

3 Claims, 4 Drawing Sheets

(56) References Cited

U.S. PATENT DOCUMENTS

| | | | | |
|---|---|---|---|---|
| 4,518,483 A | * | 5/1985 | Dickakian | C10C 3/002 |
| | | | | 208/22 |
| 4,528,087 A | * | 7/1985 | Shibatani | D01F 9/145 |
| | | | | 208/22 |
| 4,533,461 A | * | 8/1985 | Izumi | D01F 9/145 |
| | | | | 208/40 |
| 4,822,587 A | * | 4/1989 | Hino | D01F 9/145 |
| | | | | 423/447.1 |
| 10,246,642 B2 | | 4/2019 | Choie et al. | |
| 2004/0168612 A1 | * | 9/2004 | Saver | C04B 35/83 |
| | | | | 106/284 |
| 2008/0099378 A1 | | 5/2008 | He et al. | |
| 2015/0321975 A1 | | 11/2015 | Choi et al. | |
| 2017/0166821 A1 | * | 6/2017 | Choi | C10G 47/32 |
| 2018/0187093 A1 | * | 7/2018 | Choi | C10G 25/06 |
| 2018/0265792 A1 | | 9/2018 | Choi et al. | |
| 2019/0062638 A1 | * | 2/2019 | Choi | C10G 21/02 |
| 2019/0078023 A1 | * | 3/2019 | Mahfouz | C10G 11/18 |

OTHER PUBLICATIONS

PCT ISR and Written Opinion of the International searching Authority issued in PCT/US2021/032896, dated Aug. 16, 2021, 13 pages.

\* cited by examiner

PRODUCTION OF PETROLEUM PITCH

TECHNICAL FIELD

Disclosed are methods for upgrading heavy residues. Specifically, disclosed are methods and systems for producing pitch from upgraded heavy residue streams.

BACKGROUND

Pitch is generally prepared by polymerization of tar from wood, coal, and hydrocarbons. Pitch can be used to produce mesophase pitch. It is uneconomical to produce mesophase pitch from purer chemicals such as naphthalene or anthracene. Mesophase pitch can be prepared from pitch through several methods.

One method to produce mesophase pitch is dehydrogenative polymerization and cleavage of aliphatic substituents on aromatic cores. Another preparation method includes the rapid gas blowing method, as described, for example, in U.S. Pat. No. 4,209,500. In the rapid gas blowing method, a large amount of inert gas (greater than 4.0 standard cubic feet per hour (SCF/hr) per pound of pitch) is blown into the pitch to remove volatile fractions at a temperature between 380° C. and 430° C., while applying vigorous agitation to the pitch. By doing so, stacking of aromatic compounds into anisotropic state is enhanced. One of the drawbacks of this rapid gas blowing method is the long treatment time required to ensure removal of non-mesogen compounds. Non-mesogen compounds are those that cannot be converted to mesophase pitch due to their low molecular weights. Chemical bonding between mesogen and non-mesogen compounds can inhibit complete removal of non-mesogen compounds in the rapid gas blowing method. This method can take greater than 40 hours to complete. Additionally, the rapid gas blowing method can induce excessive condensation which increases the softening point of the resulting mesophase pitch. The increased softening point of the mesophase pitch requires increased temperature for spinning to produce fibers, but such increased temperature can induce pyrolytic degradation, or cutting of the fiber during spinning.

Several methods have been described for separating mesophase pitch from pitch. One method for separation uses solvent extraction to separate mesophase pitch from isotropic pitch. The solvent can include supercritical toluene. The use of supercritical toluene requires high pressure and high temperature equipment. In addition, extraction with toluene requires significant time for separating the mesophase pitch. Another method that can be used for separating mesophase pitch from isotropic pitch is the use of a centrifuge at temperatures of about 360° C. as described in U.S. Pat. No. 4,822,587. The centrifuge method can accelerate separation of mesophase pitch, but the temperature can result in inducing excessive condensation.

Finally, mesophase pitch can be produced from aromatic compounds. Aromatic compounds can be transformed to spinnable mesophase pitch by using a strong Brønsted acid catalyst, such hydrogen fluoride-boron trifluoride (HF—$BF_3$). This method can produce high quality mesophase pitch, but handling of catalyst and high cost are problematic.

Hydrogen addition processes, such as hydrotreating, are not suitable for producing mesophase pitch because such processes can saturate aromatics into naphthenes, which are non-planar molecules. The naphthenes can then be opened into long aliphatic side chains on polyaromatic compounds where the long aliphatic side chains produce steric hindrance to stacking of aromatic compounds. Coking processes are not suitable for producing mesophase pitch because structural irregularities increase due to random condensation of molecules by radical reaction.

SUMMARY

Disclosed are methods for upgrading petroleum. Specifically, disclosed are methods and systems for upgrading petroleum using pretreatment processes.

In a first aspect, a process to produce pitch is provided. The process includes the steps of introducing a depressurized effluent to a flash column, separating the depressurized effluent in the flash column to produce a vapor product and a liquid product, introducing the liquid product to a dweller, introducing an inert gas stream to the dweller, wherein the inert gas stream includes nitrogen, operating the dweller at a temperature between 350° C. and 500° C., a pressure between 0.1 psig and 10 psig, and a residence time between 30 minutes and 4 hours to produce a pitch stream and a reaction gas stream, wherein the dweller is a continuous stirred tank reactor (CSTR), wherein dehydrogenative polymerization reactions occur in the dweller to produce pitch, wherein the inert gas stream is operable to remove volatile components from the liquid product, removing a pitch stream from the dweller, wherein the pitch stream includes the pitch, and removing a reaction gas stream, wherein the reaction gas stream includes the volatile components and nitrogen.

In certain aspects, the process further includes the steps of increasing a pressure of a petroleum feedstock in a petroleum pump to produce a pressurized feedstock, wherein the pressure of the pressurized feedstock is between 23 MP and 30 MPa, increasing a temperature of the pressurized feedstock in a petroleum pre-heater to produce a hot feedstock, wherein the temperature of the hot feedstock is between 50° C. and 250° C., increasing a pressure of a water feed in a water pump to produce a pressurized water feed, wherein the pressure of the pressurized water feed is between 23 MPa and 30 MPa, increasing a temperature of the pressurized water feed in a water pre-heater to produce a supercritical feed, wherein the temperature of the supercritical water feed is between 374° C. and 600° C., mixing the hot feedstock and the supercritical water feed in a mixer to produce a mixed feed, wherein the volumetric ratio of the volumetric flow rate of the supercritical water feed at standard temperature and pressure (SATP) to the volumetric flow rate of the hot feedstock at SATP is in the range between 4:1 to 1:4, introducing the mixed feed to a supercritical reactor, operating the supercritical reactor at a reaction temperature between 380° C. and 600° C. and a reaction pressure between 23 MPa and 28 MPa to produce an effluent, reducing a temperature of the effluent in a cooling device to produce a cooled effluent, wherein the cooled effluent is at a temperature of less than 250° C., and reducing a pressure of the cooled effluent in a depressurizing device to produce the depressurized effluent, wherein depressurized effluent is at a pressure in the range between 10 psig and 550 psig. In certain aspects, the process further includes the steps of introducing the vapor product into a phase separator, separating the vapor product in the phase separator to produce a light oil stream, a water product, and a gas product, separating an oil slip stream from the light oil stream, mixing the oil slip stream with the liquid product to produce a mixed dweller feed, and introducing the mixed dweller feed to the dweller. In certain aspects, the volatile components include volatile hydrocarbons. In certain aspects, the liquid product includes less than 1 wt % water.

In a second aspect, a process to produce pitch is provided. The process includes the steps of introducing a mixed feed a first reactor, operating the first reactor at a temperature between 380° C. and 600° C., a pressure between 23 MPa and 28 MPa, and a space velocity between 1 h−1 and 60 h−1 to produce an intermediate stream, mixing the intermediate stream with a make-up water in a reactor mixer to produce an intermediate feed, introducing the intermediate feed to a second reactor, wherein the second reactor is vertically oriented, operating the second reactor at a temperature between 380° C. and 600° C., a pressure between 23 MPa and 28 MPa, and a space velocity less than the space velocity in the first reactor to produce a middle effluent and a bottom effluent, wherein the temperature in the second reactor is between 5° C. and 50° C. greater than the temperature in the first reactor, wherein a volume of the second reactor is greater than the volume in the first reactor, wherein the second reactor contains two outlets, withdrawing a bottom effluent from an outlet in a bottom portion of the second reactor, reducing a temperature of the bottom effluent in a bottom cooler to produce a cooled bottom stream, reducing a pressure of the cooled bottom stream in a bottom pressure reducer to produce a dweller feed, introducing the dweller feed to a dweller, introducing an inert gas stream to the dweller, wherein the inert gas stream includes nitrogen, operating the dweller at a temperature between 350° C. and 500° C., a pressure between 0.1 psig and 10 psig, and a residence time between 30 minutes and 4 hours to produce a pitch stream and a reaction gas stream, wherein the dweller is a continuous stirred tank reactor (CSTR), wherein dehydrogenative polymerization reactions occur in the dweller to produce pitch, wherein the inert gas stream is operable to remove volatile components from the dweller feed, removing a pitch stream from the dweller, wherein the pitch stream includes the pitch, and removing a reaction gas stream, wherein the reaction gas stream includes the volatile components and nitrogen.

In certain aspects, the process further includes the steps of withdrawing a middle effluent from the second reactor, reducing a temperature of the middle effluent in a cooling device to produce a cooled middle effluent, reducing a pressure of the cooled middle effluent in a depressurizing device to produce a depressurized effluent, introducing a depressurized effluent to a flash column, separating the depressurized effluent in a flash column to produce a vapor stream and a liquid stream, introducing the liquid stream to an oil-water separator, and separating the liquid stream in the oil-water separator to produce an upgraded oil stream and a used water stream. In certain aspects, the ratio of the total volumetric flow rate of water to the volumetric flow rate of the petroleum feedstock is between 5:1 to 1:2, wherein the total volumetric flow rate of water is the sum of the volumetric flow rate of water feed and the volumetric flow rate of make-up water. In certain aspects, the middle effluent includes non-mesogen compounds. In certain aspects, the bottom effluent includes less than 1 wt % water.

In a third aspect, a system for producing pitch is provided. The system includes a petroleum pump configured to increase a pressure of a petroleum feedstock to produce a pressurized feedstock, wherein the pressure of the pressurized feedstock is between 23 MP and 30 MPa, a petroleum pre-heater fluidly connected to the petroleum pump, the petroleum pre-heater configured to increase a temperature of the pressurized feedstock to produce a hot feedstock, wherein the temperature of the hot feedstock is between 50° C. and 250° C., a water pump configured to increase a pressure of a water feed to produce a pressurized water feed, wherein the pressure of the pressurized water feed is between 23 MPa and 30 MPa, a water pre-heater fluidly connected to the water pump, the water pre-heater configured to increase a temperature of the pressurized water feed to produce a supercritical feed, wherein the temperature of the supercritical water feed is between 374° C. and 600° C., a mixer fluidly connected to the petroleum pre-heater and the water pre-heater, the mixer configured to mix the hot feedstock and the supercritical water feed to produce a mixed feed, wherein the volumetric ratio of the volumetric flow rate of the supercritical water feed at standard temperature and pressure (SATP) to the volumetric flow rate of the hot feedstock at SATP is in the range between 4:1 to 1:4, a supercritical reactor fluidly connected to the mixer, the supercritical reactor configured to operate at a reaction temperature between 380° C. and 600° C. and a reaction pressure between 23 MPa and 28 MPa to produce an effluent, a cooling device fluidly connected to the supercritical reactor, the cooling device configured to reduce a temperature of the effluent to produce a cooled effluent, wherein the cooled effluent is at a temperature of less than 250° C., a depressurizing device fluidly connected to the cooling device, the depressurizing device configured to reduce a pressure of the cooled effluent to produce a depressurized effluent, wherein depressurized effluent is at a pressure in the range between 10 psig and 550 psig, a flash column fluidly connected to the depressurizing device, the flash column configured to separate a depressurized effluent to produce a vapor product and a liquid product, and a dweller fluidly connected to the flash column, the dweller configured to produce pitch from the liquid product, wherein a temperature of the dweller is between 350° C. and 500° C., a pressure is between 0.1 psig and 10 psig, and a residence time is between 30 minutes and 4 hours, wherein the dweller is a continuous stirred tank reactor (CSTR), wherein dehydrogenative polymerization reactions occur in the dweller to produce pitch, wherein an inert gas stream is introduced to the dweller and is operable to remove volatile components from the liquid product.

In certain aspects, the system further includes a phase separator fluidly connected to the flash column, the phase separated configured to separate the vapor product to produce a light oil stream, a water product, and a gas product.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

The processes and systems described are directed to producing pitch from heavy residue streams. Advantageously, upgrading the heavy residue can remove heteroatoms, such as sulfur, nitrogen, and metals, which can improve the quality of the pitch compared to processes in the absence of upgrading in the presence of supercritical water. Advantageously, the pitch produced by upgrading heavy residue in supercritical water processes can contain an increased carbon to hydrogen ratio, reduced amounts of heteroatoms, and reduced amounts of aliphatic side chains on aromatic compounds, relative to pitch produced by other methods. Advantageously, the supercritical water used in the methods and systems for producing pitch can remove inorganic impurities, such as alkali metals, silica, iron oxide, to produce a pitch of improved quality. Advantageously, the methods and systems add value to heavy residue streams. Advantageously, the supercritical water process can separate volatile materials from the produced pitch, which can reduce the post treatment requirements for the pitch.

The pitch produced from heavy residue in the process with supercritical water described here can be used as a precursor to produce mesophase pitch. Advantageously, the quality of the pitch produced by the processes and systems described here enable the use of the mesophase pitch in producing solid carbon materials, such as activated carbon fibers and graphitic material. Advantageously, upgrading the heavy residue in the presence of supercritical water can enhance the stacking arrangement of aromatic compounds, which can accelerate the formation of mesophase pitch from the pitch produced in the supercritical water process. The pitch produced by the supercritical water process and system described here possesses an increased amount of stacked polycyclic aromatic hydrocarbons (PACs) compared to other processes. Mesophase pitch requires structural regularity or crystallinity, the presence of stacked PACs increases crystallinity of the mesophase pitch. Supercritical water treatment of heavy residue results in a pitch with an increase of stacked PACs for at least two reasons. First, PACs move freely in supercritical water phase, which allows for greater stacking. Second, supercritical water increases the removal of long aliphatic side chains of the PACs, which reduces the steric hindrance of the PACs and increases stacking and polymerization. Supercritical water can arrange the molecules into regular forms.

As used throughout, "external supply of hydrogen" refers to the addition of hydrogen to the feed entering the reactor or to the reactor itself. For example, a reactor in the absence of an external supply of hydrogen means that the feed to the reactor and the reactor are in the absence of added hydrogen, gas ($H_2$) or liquid, such that no hydrogen (in the form of $H_2$) is a feed or a part of a feed to the reactor.

As used throughout, "external supply of catalyst" refers to the addition of catalyst to the feed entering the reactor or the presence of a catalyst in the reactor, such as a fixed bed catalyst in the reactor. For example, a reactor in the absence of an external supply of catalyst means no catalyst has been added to the feed to the reactor and the reactor does not contain a catalyst bed in the reactor.

As used throughout, "supercritical water" refers to water at a temperature at or greater than the critical temperature of water and at a pressure at or greater than the critical pressure of water. The critical temperature of water is 373.946° C. The critical pressure of water is 22.06 mega-pascals (MPa). It is known in the art that hydrocarbon reactions in supercritical water upgrade heavy oil and crude oil containing sulfur compounds to produce products that have lighter fractions. Supercritical water has unique properties making it suitable for use as a petroleum reaction medium where the reaction objectives can include conversion reactions, desulfurization reactions denitrogenation reactions, and demetallization reactions. Advantageously, at supercritical conditions water acts as both a hydrogen source and a solvent (diluent) in conversion reactions, desulfurization reactions and demetallization reactions and a catalyst is not needed. Hydrogen from the water molecules is transferred to the hydrocarbons through direct transfer or through indirect transfer, such as the water-gas shift reaction. In the water-gas shift reaction, carbon monoxide and water react to produce carbon dioxide and hydrogen. The resulting hydrogen can be transferred to hydrocarbons in conversion desulfurization reactions, demetallization reactions, denitrogenation reactions, and combinations.

As used throughout, "pitch" or "isotropic pitch" refers to the IUPAC gold books definition of a residue from pyrolysis of petroleum which is solid at room temperature, consisting of a complex mixture of numerous, essentially aromatic hydrocarbons and heterocyclic compounds. Isotropic pitch is a pitch having optical isotropic nature, meaning no regular structure. Pitch can contain aliphatic, naphthenic, and aromatic compounds. Pitch can include heteroatoms, including sulfur compounds, nitrogen compounds, organometallic compounds, and combinations of the same. Pitch is solid at ambient conditions. Pitch has a softening point of about 137° C. As used throughout, references to "pitch" do not include mesophase pitch. Pitch does not include coke and processes that produce coke do not produce pitch.

As used throughout, "mesophase pitch" refers to a pitch having optical anisotropic nature with a liquid crystalline nature and a short range orientational residue-end carbon materials. Mesophase pitch can be prepared by heat treatment of pitch at temperatures in the range between 300° C. and 500° C. Mesophase pitch produced from the pitch produced in the dweller can include a toluene insoluble fraction less than 70 wt % and alternately less than 60 wt %.

As used throughout, "coke" refers to the toluene insoluble material present in petroleum. Solid coke, such as coke from a delayed coker or a fluid coker, can contain a toluene insoluble material greater than 70 wt %.

As used throughout, "cracking" refers to the breaking of hydrocarbons into smaller ones containing few carbon atoms due to the breaking of carbon-carbon bonds.

As used throughout, "upgrade" means one or all of increasing API gravity, decreasing the amount of heteroatoms, decreasing the amount of asphaltenes, decreasing the amount of the atmospheric fraction, increasing the amount of light fractions, decreasing the viscosity, and combinations of the same, in a process outlet stream relative to the process feed stream. One of skill in the art understands that upgrade can have a relative meaning such that a stream can be upgraded in comparison to another stream, but can still contain undesirable components such as heteroatoms.

As used throughout, "conversion reactions" refers to reactions that can upgrade a hydrocarbon stream including cracking, isomerization, alkylation, dimerization, aromatization, cyclization, desulfurization, denitrogenation, deasphalting, and demetallization.

As used throughout, "space velocity" refers to the ratio of flow rate into a reactor to the internal reactor volume, having units per hour ($h^{-1}$).

The following embodiments, provided with reference to the figures, describe the upgrading process.

An embodiment of the process to produce pitch is described with reference to FIG. 1. Petroleum feedstock 5 is introduced to petroleum pump 105. Petroleum feedstock 5 can be any heavy oil stream. Heavy oil streams suitable for use as petroleum feedstock 5 can include a heavy residue stream, a decant oil from a fluid catalytic cracking (FCC) unit, pyrolysis fuel oil, and combinations of the same. Heavy residue streams can have a T5% greater than 600 degrees Fahrenheit (° F.)(315 degrees Celsius (° C.)), an aromatic content greater than 60 wt % and alternately greater than 70 wt %, as measured using a high-performance liquid chromatograph (HPLC) method, an asphaltene content of less than 15 wt % and alternately less than 2 wt %, as measured by the n-heptane insoluble fraction, a hydrogen to carbon molar ratio of less than 1.7 and alternately less than 1.5, and combinations of the same. Heavy residue streams can include atmospheric residue streams from distillation of crude oil, vacuum residue streams from distillation of crude oil, vacuum gas oil from vacuum distillation unit, visbreaker bottoms, and combinations of the same. A slurry oil from an FCC can have a solids content of less than 100 wt ppm, a T5% greater than 280° C. and alternately greater than 300° C., and combinations of the same. A pyrolysis fuel oil from a steam cracker can have a T5% of greater than 180° C. and alternately greater than 200° C., a hydrogen to carbon molar ratio of less than 1, and combinations of the same. In at least one embodiment, petroleum feedstock 5 can include distillate range hydrocarbons, having boiling points of less than 370° C.

The pressure of petroleum feedstock 5 can be increased in petroleum pump 105 to produce pressurized feedstock 15. Petroleum pump 105 can be any type of pump capable of increasing the pressure of an oil stream. Examples of petroleum pump 105 can include metering pumps, plunger pumps, and combinations of the same. The pressure of pressurized feedstock 15 can be greater than 22 MPa, alternately between 23 MPa and 30 MPa, and alternately between 23 MPa and 27 MPa. Pressurized feedstock 15 can be introduced to petroleum pre-heater 115.

The temperature of pressurized feedstock 15 can be increased in petroleum pre-heater 115 to produce hot feedstock 25. Petroleum pre-heater 115 can be any type of unit capable of increasing the temperature of a pressurized oil stream. Examples of petroleum pre-heater 115 can include electric heaters, fired heaters, heat exchangers, and combinations of the same. The temperature of hot feedstock 25 can be in the range between 50 degrees Celsius (° C.) and 250° C., alternately in the range between 100° C. and 250° C., alternately in the range between 150° C. and 250° C., and alternately in the range between 200° C. and 250° C.

Water feed 10 is introduced to water pump 100. Water feed 10 can be from any source of demineralized water. Water feed 10 can be demineralized water having a conductivity of less than 1 microSiemens per centimeter (µS/cm), alternately less than 0.5 µS/cm, and alternately less than 0.1 µS/cm. Water feed 10 can be demineralized water having a sodium content of less than 5 micrograms per liter (µg/l) and alternately less than 1 µg/l. Water feed 10 can be demineralized water having a chloride content of less than 5 µg/l and alternately less than 1 µg/l. Water feed 10 can be demineralized water having a silica content of less than 3 µg/l.

The pressure of water feed 10 can be increased in water pump 100 to produce pressurized water feed 20. Water pump 100 can be any type of pump capable of increasing the pressure of a water stream. Examples of water pump 100 can include metering pumps, plunging pumps, and combinations of the same. The pressure of pressurized water feed 20 can be greater than 22 MPa, alternately between 23 MPa and 30 MPa, and alternately between 23 MPa and 27 MPa. Pressurized water feed 20 can be introduced to water pre-heater 110.

The temperature of pressurized water feed 20 can be increased in water pre-heater 110 to produce supercritical water feed 30. Water pre-heater 110 can be any type of heat exchanger capable of increasing the temperature of a pressurized water feed. The temperature of supercritical water feed 30 can be between 374° C. and 600° C. and alternately between 400° C. and 550° C. Supercritical water feed 30 contains supercritical water.

Supercritical water feed 30 can be introduced to mixer 120 along with hot feedstock 25. The volumetric ratio of the volumetric flow rate of supercritical water feed 30 at standard temperature and pressure (SATP) to the volumetric flow rate of hot feedstock 25 at SATP can be in the range between 4:1 to 1:4 and alternately in the range between 1:1 to 1:2.

Supercritical water feed 30 and hot feedstock 25 can be mixed in mixer 120 to produce mixed feed 35. Mixer 120 can be any type of mixing unit capable of mixing a supercritical water stream and hydrocarbons. Mixed feed 35 can be introduced to supercritical water (SCW) reactor 40.

Mixed feed 35 can be treated in supercritical reactor 130 to produce effluent 40. Supercritical reactor 130 can be any type of hydrocarbon upgrading unit that facilitates reaction of hydrocarbons in the presence of supercritical water. Supercritical reactor 130 can include one or more reactors in series. Supercritical reactor 130 can include vessel type reactors and tubular type reactors. The vessels of supercritical reactor 130 can be vertical, horizontal, or a combination of the same. In at least one embodiment, supercritical reactor 130 includes a tubular type reactor. Supercritical reactor 130 can be in the absence of an external supply of hydrogen. Supercritical reactor 130 can be in the absence of an external supply of catalyst. Supercritical reactor 130 can have reaction temperature, reaction pressure, and a reaction residence time. The reaction temperature in supercritical reactor 130 can be in the range between 380° C. and 600° C., alternately between 380° C. and 500° C., and alternately between 400° C. and 450° C. Reaction temperature is measured at the outlet of supercritical reactor 130. The reaction pressure in supercritical reactor 130 can be in the range between 22 MPa and 30 MPa, alternately between 23 MPa and 28 MPa, and alternately between 23 MPa and 27 MPa. The residence time in supercritical reactor 130 can be in the range between 1 minute and 60 minutes and alternately between 2 minutes and 27 minutes. Residence time of supercritical reactor 130 can be calculated by assuming the density of the fluid in supercritical reactor 130 has the density of water at reaction conditions. The space velocity in supercritical reactor 130 can be between 1 $h^{-1}$ and 60 $h^{-1}$ and alternately between 2.2 $h^{-1}$ and 30 $h^{-1}$.

It is known in the art that hydrocarbon reactions in supercritical water upgrade heavy oil and crude oil containing sulfur compounds to produce products that have lighter fractions. Supercritical water has unique properties making it suitable for use as a petroleum reaction medium where the reaction objectives can include conversion reactions, desulfurization reactions denitrogenation reactions, and demetallization reactions. Supercritical water is water at a temperature at or greater than the critical temperature of water and at a pressure at or greater than the critical pressure of water. The critical temperature of water is 373.946° C. The critical pressure of water is 22.06 MPa. Advantageously, at supercritical conditions water acts as both a hydrogen source and a solvent (diluent) in conversion reactions, desulfurization reactions and demetallization reactions and a catalyst is not needed. Hydrogen from the water molecules is transferred to the hydrocarbons through direct transfer or through indirect transfer, such as the water-gas shift reaction. In the water-gas shift reaction, carbon monoxide and water react to produce carbon dioxide and hydrogen. The hydrogen can be transferred to hydrocarbons in desulfurization reactions, demetallization reactions, denitrogenation reactions, and combinations of the same. The hydrogen can also reduce the olefin content. The production of an internal supply of hydrogen can reduce coke formation.

Without being bound to a particular theory, it is understood that the basic reaction mechanism of supercritical water mediated petroleum processes is the same as a free radical reaction mechanism. Radical reactions include initiation, propagation, and termination steps. With hydrocarbons, especially heavy molecules such as $C_{10}^+$, initiation is the most difficult step and conversion in supercritical water can be limited due to the high activation energy required for initiation. Initiation requires the breaking of chemical bonds. The bond energy of carbon-carbon bonds is about 350 kJ/mol, while the bond energy of carbon-hydrogen is about 420 kJ/mol. Due to the chemical bond energies, carbon-carbon bonds and carbon-hydrogen bonds do not break easily at the temperatures in a supercritical water process, 380° C. to 450° C., without catalyst or radical initiators. In contrast, aliphatic carbon-sulfur bonds have a bond energy of about 250 kJ/mol. The aliphatic carbon-sulfur bond, such as in thiols, sulfide, and disulfides, has a lower bond energy than the aromatic carbon-sulfur bond.

However, beta-scission of long chain (alkyl) aromatics can occur in supercritical water process which can produce paraffins and short chain aromatics. As a result, the product from a supercritical water process can result in a greater amount of aromatic compounds relative to the feed.

Thermal energy creates radicals through chemical bond breakage. Supercritical water creates a "cage effect" by surrounding the radicals. The radicals surrounded by water molecules cannot react easily with each other, and thus, intermolecular reactions that contribute to coke formation are suppressed. The cage effect suppresses coke formation by limiting inter-radical reactions. Supercritical water, having a low dielectric constant, dissolves hydrocarbons and surrounds radicals to prevent the inter-radical reaction, which is the termination reaction resulting in condensation (dimerization or polymerization). Moreover, the dielectric constant of supercritical water can be tuned by adjusting the temperature and pressure. Because of the barrier set by the supercritical water cage, hydrocarbon radical transfer is more difficult in supercritical water as compared to conventional thermal cracking processes, such as delayed coker, where radicals travel freely without such barriers.

Additionally, dissolving the hydrocarbons creates access for the water to contact the indigenous species in the crude oil. The indigenous species are attached to the oil physically and chemically. The indigenous species can interact with droplets of oil and water through hydrophilic (polar) and lipophilic (non-polar) functional groups. The indigenous species can reduce the interfacial surface tension between oil and water. The alkali content in the crude oil of mixed feed 35 can activate the natural surfactants, by converting the natural surfactants to their salts.

Sulfur compounds released from sulfur-containing molecules can be converted to $H_2S$, mercaptans, and elemental sulfur. Without being bound to a particular theory, it is believed that hydrogen sulfide is not "stopped" by the supercritical water cage due its small size and chemical structure similar to water ($H_2O$). Hydrogen sulfide can travel freely through the supercritical water cage to propagate radicals and distribute hydrogen. Hydrogen sulfide can lose its hydrogen due to hydrogen abstraction reactions with hydrocarbon radicals. The resulting hydrogen-sulfur (HS) radical is capable of abstracting hydrogen from hydrocarbons which will result in formation of more radicals. Thus, $H_2S$ in radical reactions acts as a transfer agent to transfer radicals and abstract/donate hydrogen.

Conversion reactions can occur in supercritical reactor 130. The oil in supercritical reactor 130 can be upgraded to produce oil having increased amounts of lighter hydrocarbon fractions relative to the hydrocarbons in petroleum feedstock 5.

Effluent 40 can be introduced to cooling device 140. The temperature of effluent 40 can be reduced in cooling device to produce cooled effluent 45. Cooling device 140 can be any type of heat exchanger capable of reducing the temperature of the effluent from the supercritical reactor. The temperature of cooled effluent 45 can be less than 250° C., alternately between 150° C. and 250° C. Cooled effluent 45 can be introduced to depressurizing device 145.

The pressure of cooled effluent 45 can be reduced in depressurizing device 145 to produce depressurized effluent 50. Depressurizing device 145 can be any type of pressure reducing unit capable of reducing the pressure of a reactor effluent stream. The pressure of depressurized effluent 50 can be less than the steam pressure of water at the temperature of cooled effluent 45. The pressure in depressurized effluent 50 can be in the range between 10 psig (0.0069 MPa) and 550 psig (3.79 MPa). At pressures less than the steam pressure of water, the water present in depressurized effluent 50 can be in vapor form. Depressurized effluent 50 can be introduced to flash column 150.

Flash column 150 can be any type of vessel capable of separating a gas phase, an oil phase, and a water phase in a reactor effluent stream. Flash column 150 can by a vertical vessel or a horizontal vessel. Flash column 150 can include an internal structure for enhancing separation efficiency. Flash column 150 can be maintained at operating conditions such that greater than 99 weight percent (wt %) of the water in depressurized effluent 50 can be maintained in the vapor phase and the T5% of the liquid phase is increased. Operating the flash column 150 such that greater than 99 wt % of the water is in the vapor phase minimizes the amount of water that remains in the liquid phase. Flash column 150 can be operated at a temperature between 150° C. and 250° C. and a pressure between 10 psig (0.0069 MPa) and 550 psig (3.79 MPa). Flash column 150 can produce vapor product 55 and liquid product 60. Liquid product 60 can include upgraded hydrocarbons relative to the hydrocarbons in petroleum feedstock 5. Liquid product 60 can contain stacked PACs, but the amount of stacked PACs is less than the amount of stacked PACs in pitch stream 70. Liquid product 60 can contain less than 1 wt % water, alternately less than 0.5 wt %, and alternately less than 0.3 wt %. Liquid product 60 can include heavy fractions and light fractions.

Minimizing the amount of water in liquid product 60 can improve the quality of the pitch produced in dweller 160.

Liquid product 60 can be introduced to dweller 160. In at least one embodiment, the temperature of liquid product 60 can be increased in a heater (not shown) prior to being introduced to dweller 160. The heater can be any type of heating device, such as an electric heater on the piping, a heat exchanger, or a cross exchanger with another part of the process.

Dweller 160 can be any type of soaker unit configured to convert hydrocarbons to pitch. Hydrocarbons undergo polycondensation reactions to produce pitch. Aromatic compounds are a major reactant in the polycondensation reactions. Naphthenic compounds and olefinic compounds are also reactants in the polycondensation reactions, but to a lesser extent than the aromatic compounds. The majority of conversion reactions occur with the aromatic compounds Dweller 160 can be a continuous stirred tank reactor (CSTR). A CSTR contains an internal agitator. Dweller 160 can have an internal volume such that a residence time of liquid product 60 is between 30 minutes and 4 hours. The liquid volume in dweller 160 is maintained at about 60% of the internal volume by adjusting the flow rate of pitch stream 70 through a control valve. Dweller 160 is operated at a temperature between 350° C. and 500° C., alternately between 400° C. and 450° C., alternately between 400° C. and 440° C. Dweller 160 can include an internal heater or external heater to maintain the temperature. Dweller 160 is maintained at a pressure slightly above atmospheric pressure, alternately between 0.1 psig (0.69 kPa) and 10 psig (69 kPa), and alternately between 0.1 psig (0.69 kPa) and 0.5 psig (3.45 kPa). The residence time in dweller 160 can be between 30 minutes and 4 hours.

Dweller 160 is not a visbreaker, which operates at temperatures greater than 450° C., is not a delayed coker which operates for a residence time of greater than 5 hours, and is not a fluid coker which operates at a temperature greater than 480° C. Dweller 160 is in the absence of a fluidized bed. In at least one embodiment, dweller 160 is in the absence of a catalyst. In at least one embodiment, dweller 160 contains a Lewis acid as catalyst.

Inert gas stream 65 can be introduced into dweller 160. Inert gas stream 65 can be sparged into dweller. Inert gas stream 65 can contain inert gases. The inert gases can include nitrogen. Inert gas stream 65 is in the absence of oxygen. The flow rate of inert gas stream 65 can be at a rate between 5 liters per minute (l/min) per liter of internal fluid and 10 l/min per liter of internal fluid in dweller 160.

Dweller 160 with inert gas stream 65 can take advantage of the "meta-stability" of hydrocarbons in effluent 40. Effluent 40 has limited stability due to the presence of unsaturated bonds in the olefinic groups. Subjecting the "meta-stable" hydrocarbons in effluent 40 to dweller 160 the aromatic sheet can be extended and stacked. Thus, the use of dweller 160 takes advantage of the product of the conversion reactions in supercritical reactor 130 and the thermal energy.

In dweller 160, dehydrogenative polymerization reactions can occur with the aid of the inert gases removing volatile components. The volatile components separated from the internal fluid in dweller 160 can be collected by the inert gases and exit dweller 160 in reaction gas stream 75. Volatile components can include volatile hydrocarbons. Additionally, any water present in dweller 160 can be removed with the inert gases in reaction gas stream 75.

Pitch stream 70 can be removed from dweller 160. Pitch stream 70 can contain pitch. Pitch stream 70 can be further processed in a mesophase pitch production unit. In the mesophase pitch production unit the pitch can be subjected to further processing including dehydrogenative polymerization and aromatic stacking.

Reaction gas stream 75 can be treated to recover valuable hydrocarbons such as naphtha and gas oil.

Figure 1:
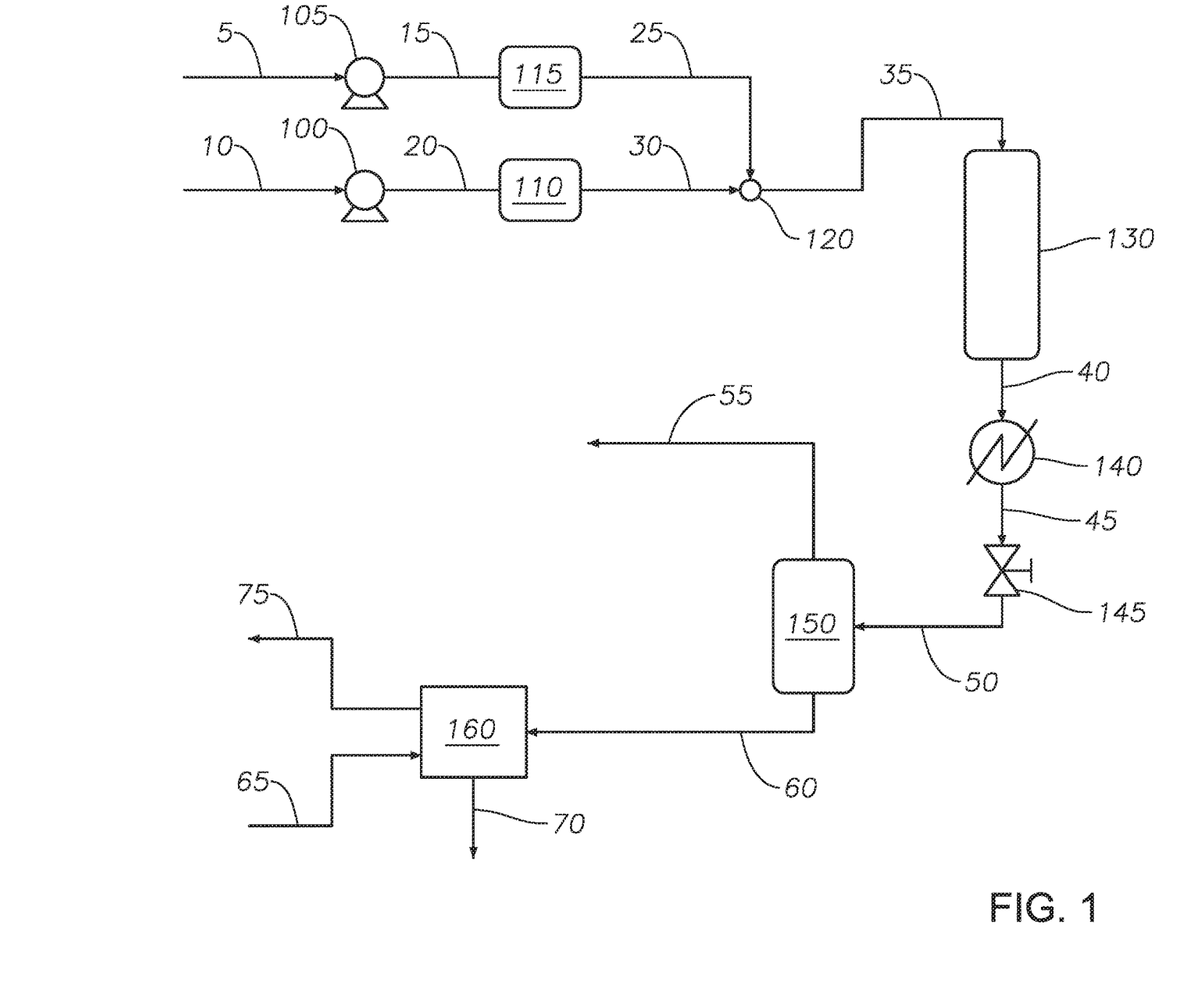
FIG. 1 provides a process diagram of an embodiment of the upgrading process.
Figure 2:
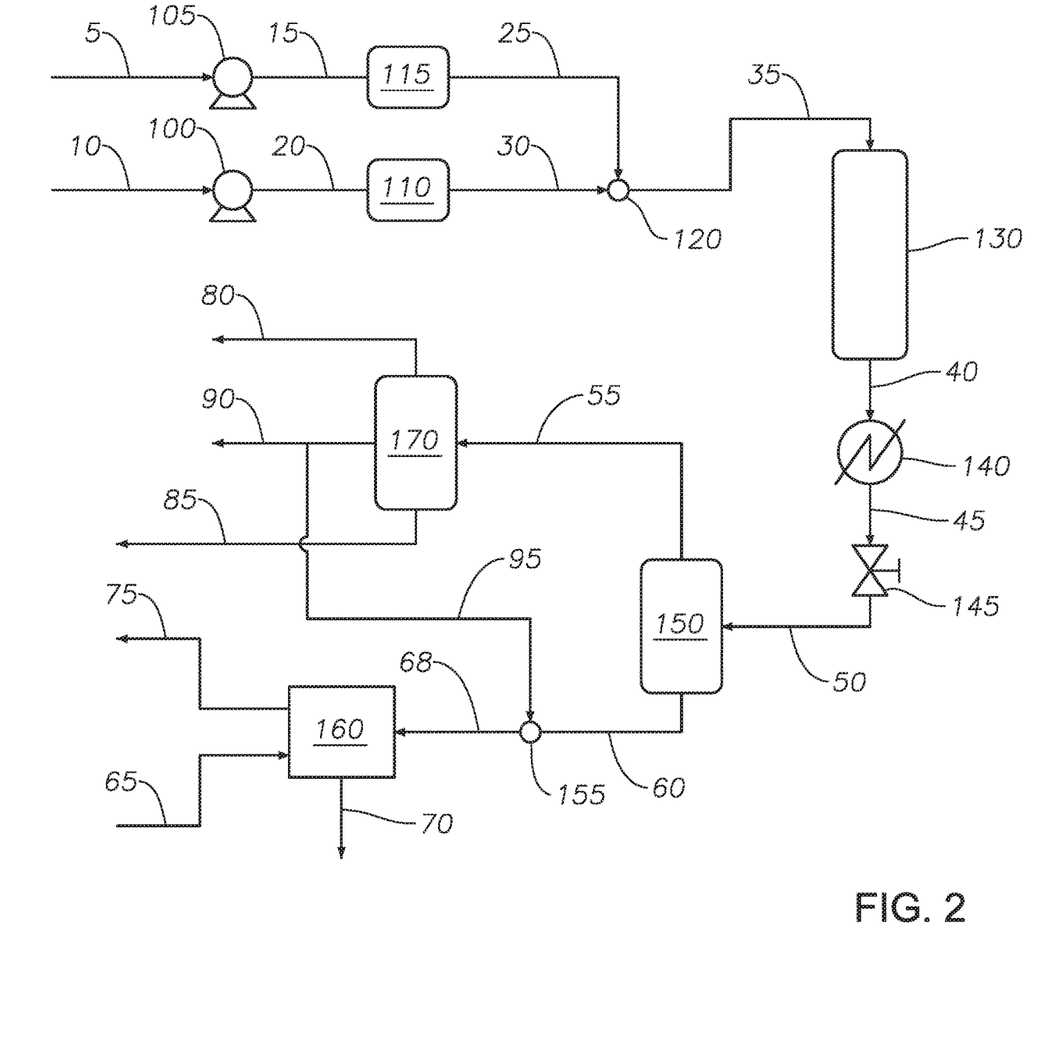
FIG. 2 provides a process diagram of an embodiment of the upgrading process

An embodiment of the process to produce pitch is shown in FIG. 2, with reference to FIG. 1. Vapor product 55 can be introduced to phase separator 170. Phase separator 170 can separate vapor product 55 to produce gas product 80, water product 85, and light oil stream 90. Gas product 80 can be further treated or destroyed.

Water product 85 can include inorganic impurities separated from the heavy residue in supercritical reactor 130. In supercritical reactor 130, the supercritical water acts as a wash water removing the inorganic impurities from the heavy residue and improving the quality of the liquid product 60, which improves the quality of the pitch in pitch stream 70. Water product 85 can be further treated.

A portion of light oil stream 90 can be separated as oil slip stream 95. The volumetric ratio of the flow rate of light oil stream 90 to oil slip stream 95 is between 5:95 and 95:5. Oil slip stream 95 can be introduced to oil mixer 155 and mixed with liquid product 60 to produce mixed dweller feed 68. Mixed dweller feed 68 can be introduced to dweller 160. The addition of oil slip stream 95 can reduce the viscosity of liquid product 60. Mixed dweller feed 68 can have a viscosity of less than 100 cP, alternately less than 50 cP, alternately between 1 cP and 100 cP, and alternately 10 cP. Reducing the viscosity of liquid product 60 can increase removal of volatile components from dweller 160. Additionally, aromatic compounds in light oil stream 90 can be converted to pitch in dweller 160.

In at least one embodiment, vapor product 55 can be further cooled in a heat exchanger (not shown) before being introduced to phase separator 170.

Figure 3:
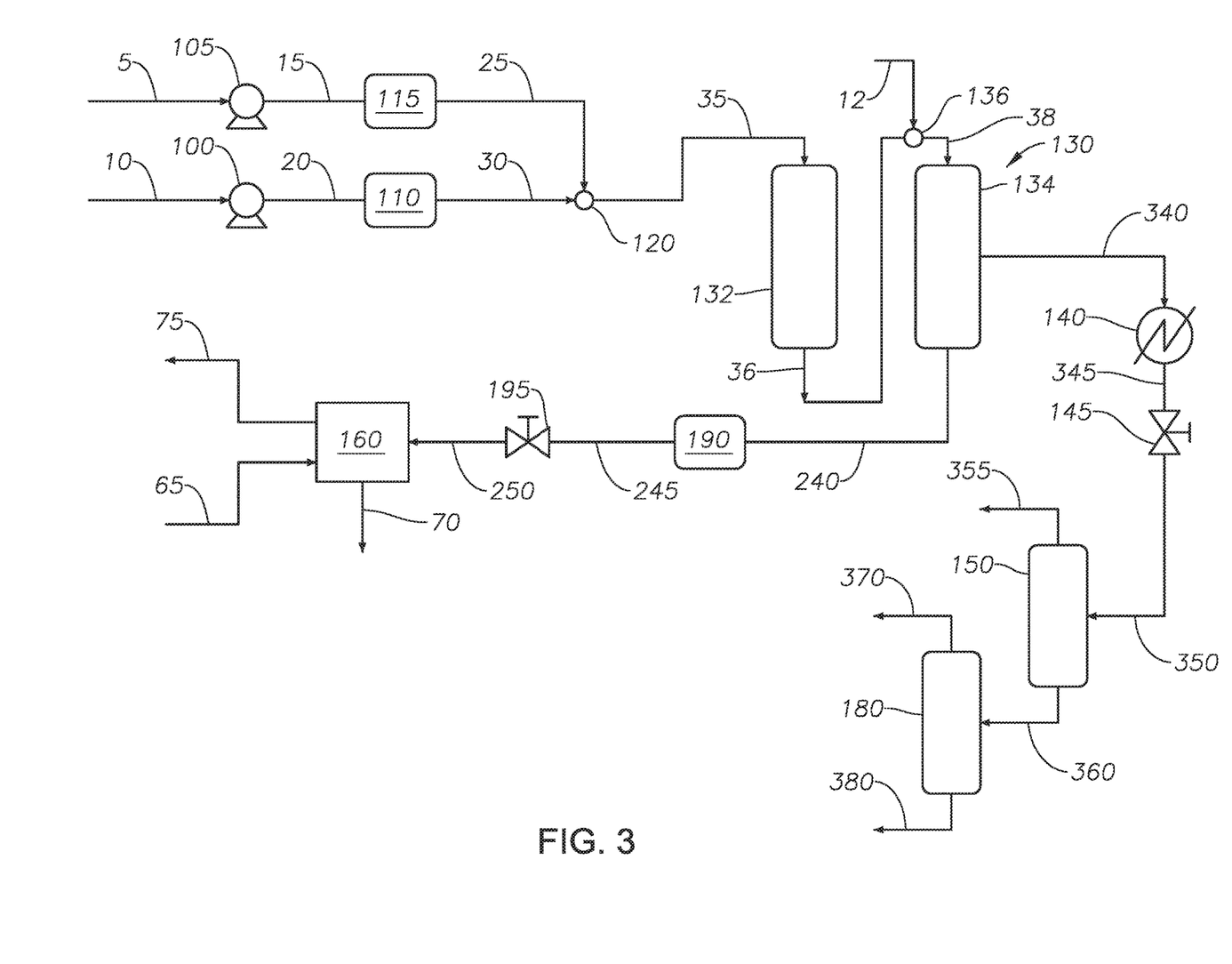
FIG. 3 provides a process diagram of an embodiment of the upgrading process.

An alternate embodiment of the process to produce pitch is described with reference to FIG. 3, with reference to FIG. 1.

In an embodiment Supercritical reactor 130 is two reactor units in series, first reactor 132 and second reactor 134. First reactor 132 can be vertically oriented or horizontally oriented. The reaction temperature in first reactor 132 can be in the range between 380° C. and 600° C., alternately between 380° C. and 500° C., and alternately between 400° C. and 450° C. The reaction pressure in first reactor 132 can be in the range between 22 MPa and 30 MPa, alternately between 23 MPa and 28 MPa, and alternately between 23 MPa and 27 MPa. The residence time in first reactor 132 can be in the range between 1 minute and 60 minutes and alternately between 2 minutes and 27 minutes. The residence time of first reactor 132 can be calculated by assuming the density of the fluid in first reactor 132 has the density of water at reaction conditions. The space velocity in first reactor 132 can be between 1 $h^{-1}$ and 60 $h^{-1}$ and alternately between 2.2 $h^{-1}$ and 30 $h^{-1}$. First reactor 132 can produce intermediate stream 36. Intermediate stream 36 can be introduced to reactor mixer 136.

Make-up water 12 can be introduced to reactor mixer 136. The ratio of the volumetric flow rate of make-up water 12 at SATP to water feed 10 at SATP can be in the range between 4:1 and 1:4. The ratio of the total volumetric flow rate of water, water feed 10 plus make-up water 12, at SATP to petroleum feedstock 5 can be in the range between 5:1 and 1:2. Make-up water 12 and intermediate stream 36 can be mixed in reactor mixer 136 to produce intermediate feed 38. Intermediate feed 38 can be introduced to second reactor 134.

Second reactor 134 can be vertically oriented. The space velocity in second reactor 134 at SATP can be in the range between 1.0 h$^{-1}$ and 6.0 h$^{-1}$ and alternately between 1.25 h$^{-1}$ and 3.5 h$^{-1}$. The volume of second reactor 134 can be greater than the volume of first reactor 132 to provide enough volume to allow the fluid to separate into a lights layer and heavy layer. Second reactor 134 can include a top portion defined as any position within 10% of the total length measured from the highest vertical position of the reactor. Second reactor 134 can include a bottom portion defined as any position within 10% of the total length measured from the lowest vertical position of the reactor. The reaction temperature in second reactor 134 can be in the range between 380° C. and 600° C., alternately between 380° C. and 500° C., and alternately between 400° C. and 450° C. The temperature in second reactor 134 can be maintained at a temperature between 5° C. and 50° C. and alternately between 10° C. and 20° C. greater than the temperature in first reactor 132. The reaction pressure in second reactor 134 can be in the range between 22 MPa and 30 MPa, alternately between 23 MPa and 28 MPa, and alternately between 23 MPa and 27 MPa. Second reactor 134 is not a plug flow reactor.

Second reactor 134 can produce two outlet streams through two separate outlets. An outlet in the middle portion of reactor 134 can be positioned between 30 vol % and 60 vol % from the top of second reactor 134. Middle effluent 340 can be removed from the outlet in the middle of reactor 134. Middle effluent 340 contains the lights layer formed in second reactor 134. Middle effluent 340 can include paraffins and short chain aromatics. Make-up water 12 can dilute intermediate stream 36. Diluting intermediate stream 36 means the non-mesogen compounds in intermediate feed 38 can be removed through middle effluent 340. Non-mesogen compounds cannot be converted to mesophase pitch, thus utilizing two outlet stream improves the quality of pitch produced in dweller 160. Bottom effluent 240 can be removed from an outlet in the bottom portion of second reactor 134. Bottom effluent 240 can contain heavier hydrocarbons and can include an increased concentration of multi-ring aromatics relative to middle effluent 340 or effluent 40. Multi-ring aromatics are good precursors for producing pitch. The increased water to oil ratio in intermediate feed 38 means second reactor 134 can effectively extract heavier hydrocarbons. Second reactor 134 can be designed as a reactor and separator and the placement of the outlet in the middle portion of reactor 134 and the outlet in the bottom portion effects the separation.

The amount of water present in bottom effluent 240 can depend on the conditions of second reactor 134. The amount of water in bottom effluent 240 can be controlled by controlling the flow rate of bottom effluent 240. The amount of water can be minimized to less than 1 wt % and alternately less than 0.3 wt %. Reducing the amount of water in bottom effluent 240 improves the quality of the pitch produced in dweller 160, because water can include alkali metals and inorganic compounds.

Bottom effluent 240 is at a temperature between 400° C. and 450° C. Bottom effluent 240 can be introduced to bottom cooler 190. Bottom cooler 190 can be any type of heat exchanger capable of reducing the temperature of bottom effluent 240. The temperature of bottom effluent 240 can be reduced in bottom cooler 190 to produce cooled bottom stream 245. The temperature of cooled bottom stream 245 can be between 150° C. and 350° C. and alternately between 250° C. and 350° C. The temperature of cooled bottom stream 245 is less than the temperature of cooled middle effluent. The temperature of cooled bottom stream 245 is selected based on the desired viscosity of cooled bottom stream 245. The viscosity of cooled bottom stream 245 should be such that the stream can flow through bottom pressure reducer 195. Cooled bottom stream 245 can be introduced to bottom pressure reducer 195.

The pressure of cooled bottom stream 245 can be reduced in bottom pressure reducer 195 to produce dweller feed 250. Bottom pressure reducer 195 can be any type of device capable of reducing the pressure of a hydrocarbon containing stream. The pressure of dweller feed 250 can be between 0.1 psig and 10 psig.

Dweller feed 250 can be introduced to dweller 160, described with reference to FIG. 1.

Middle effluent 340 can be introduced to cooling device 140. The temperature of middle effluent 340 can be reduced in cooling device 140 to produce cooled middle effluent 345. Cooled middle effluent 345 can have the same conditions as cooled effluent 45. Cooled middle effluent 345 can be introduced to depressurizing device 145. The pressure of cooled middle effluent 345 can be reduced in depressurizing device 145 to produce depressurized middle effluent 350. Depressurized middle effluent 350 can have the same conditions as depressurized effluent 50. Depressurized middle effluent 350 can be introduced to flash column 150. Depressurized middle effluent can be separated in flash column 150 to produce vapor stream 355 and liquid stream 360. Liquid stream 360 is in the absence of heavy fractions because the heavy fractions were removed from second reactor 134 in bottom effluent 240. Liquid stream 360 contains less amount of heavy fractions than liquid product 60.

Liquid stream 360 can be introduced to oil-water separator 180. Oil-water separator 180 can separate liquid stream 360 into upgraded oil stream 370 and used water stream 380. Upgraded oil stream 370 contains upgraded hydrocarbons relative to petroleum feedstock 5. Used water stream 380 contains water. Used water stream 380 can contain dissolved organic compounds and inorganic compounds.

EXAMPLES

The Example is a simulated analysis based on experimental data of the process for producing pitch. The simulation is according to the process of FIG. 4. Petroleum feedstock 5 had the properties in Table 1.

TABLE 1

| Properties of Petroleum Feedstock 5 | |
|---|---|
| Property | |
| API Gravity | 14.08 |
| K-Factor (Watson) | 11.61 |
| Carbon to Hydrogen ratio (mol/mol) | 0.61 |
| Sulfur (wt %) | 3.36 |
| Hydrogen (wt %) | 11.7 |
| Viscosity @ 122 deg F. (50 deg C.) (cSt) | 482.1 |
| Viscosity @ 222 deg F. (100 deg C.) (cSt) | 41.9 |
| Asphaltenes (wt %) | 2.9 |
| Conradson Carbon (wt %) | 10.2 |
| Vanadium (wt ppm) | 40.5 |
| Nickel (wt ppm) | 10.1 |
| HPLC - saturates (wt %) | 17.7 |
| HPLC - aromatics (total) (wt %) | 74.1 |
| Distillation Values (TBP) | |
| 5% | 384 |
| 10% | 391 |
| 20% | 423 |

TABLE 1-continued

| Properties of Petroleum Feedstock 5 | |
|---|---|
| 30% | 451 |
| 50% | 517 |
| 70% | 612 |
| 80% | 669 |
| 90% | 791 |
| 95% | 890 |

Figure 4:
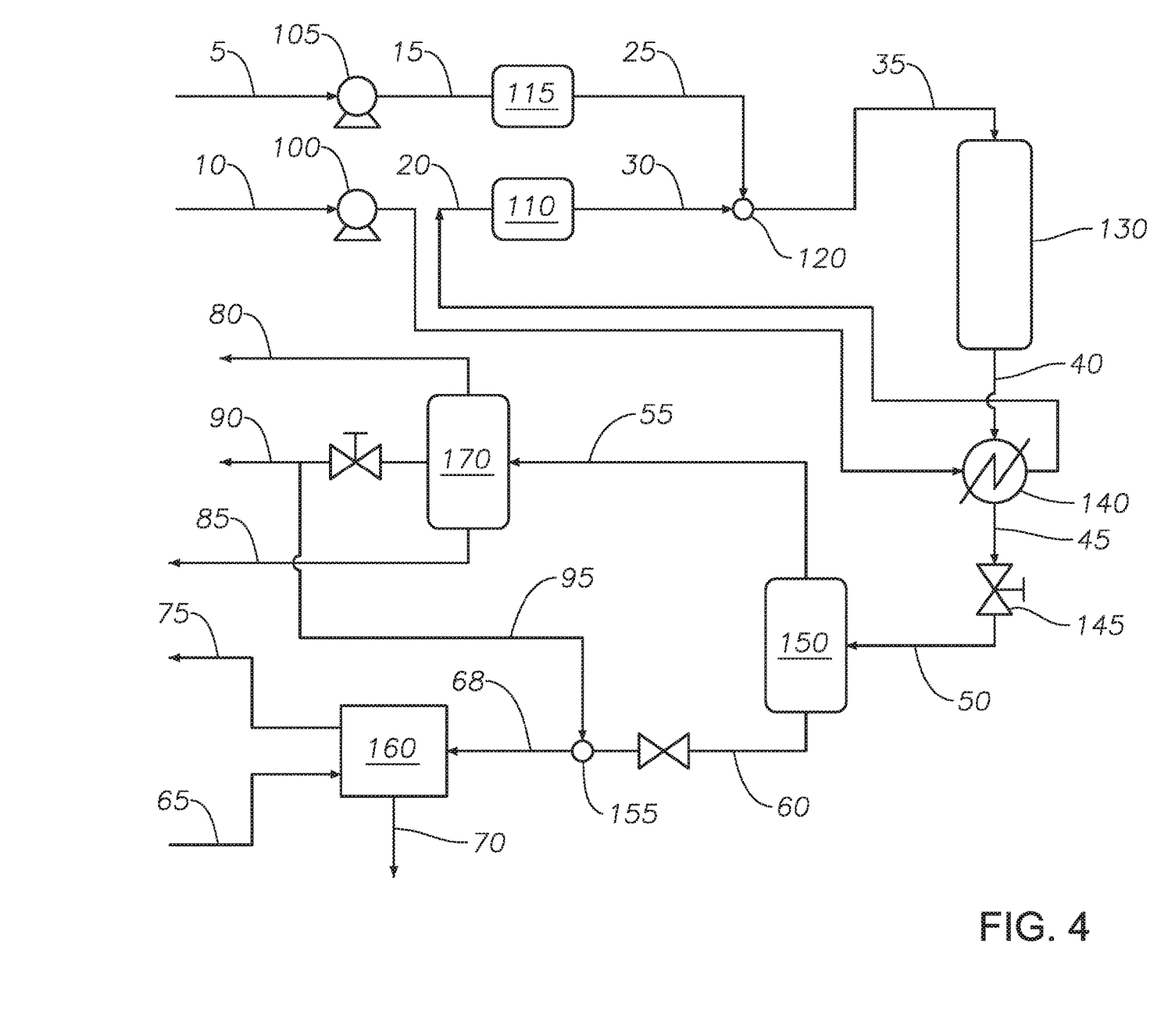
FIG. 4 provides a process diagram of an embodiment of the upgrading process.

Petroleum feedstock 5 was introduced at a rate of 1542.2 kilogram per day (kg/day) and a temperature 90° C. The pressure of petroleum feedstock 5 was increased in petroleum pump 105 to 27 MPa and the temperature was increased in petroleum pre-heater 115 to 150° C. to produce hot feedstock 25 at a temperature of 150° C. and 27 MPa. Water feed 10 was introduced at flow rate of 1586.7 kg/day and a temperature of 25° C. The pressure was increased in water pump 100 and the temperature was increased in cooling device 140 and water pre-heater 110 to produce supercritical water feed at a temperature of 520° C. and a pressure of 27 MPa. Mixed feed 35 had a temperature of 406° C. and 27 MPa and a total flow rate of 3128.9 kg/h. Mixed feed 35 is introduced to supercritical reactor 130. Effluent 40 was at a temperature of 450° C. and 27 MPa and a flow rate of 3128.9 kg/h. Effluent 40 was cooled, depressurized and introduced to flash drum 150. Liquid product 60 was mixed with the entire volume of light oil stream 90 and introduced to dweller 160. The conditions of the post reactor streams are shown in Table 2.

TABLE 2

| Stream Values | | | | | | | | | |
|---|---|---|---|---|---|---|---|---|---|
| | 60 | 55 | 80 | 85 | 90 | 68 | 65 | 70 | 75 |
| Temperature (° C.) | 200 | 200 | 35 | 35 | 35 | 176 | 25 | 420 | 420 |
| Pressure (MPa) | 0.5 | 0.5 | 0.5 | 0.5 | 0.5 | 0.05 | 0.05 | 0.05 | 0.05 |
| Mass Flow (kg/day) | 1342.7 | 1786.2 | 21.3 | 1587.7 | 177.2 | 1519.9 | 14.4 | 356.4 | 1458.0 |

The residence time in dweller 160 was 2 hours and was simulated as having internal agitators. The yield of pitch from petroleum feedstock 5 was about 23 wt %. The properties of the pitch in pitch stream 70 are shown in Table 3.

TABLE 3

| Properties of pitch in pitch stream 70 | |
|---|---|
| Property | |
| Specific Gravity | 1.15 |
| Softening Point (° C.) | 137 |
| Quinoline Insoluble (wt %) | 7 |
| Benzene Insoluble (wt %) | 15 |
| Hydrogen content (wt %) | 4.7 |
| Hydrogen to Carbon ratio (mol/mol) | 0.77 |
| Sulfur content (wt %) | 0.86 |

The pitch with properties as shown in Table 3 was introduced to a mesophase pitch production unit to be converted to anisotropic pitch. The process to produce pitch with supercritical water produces 89% anisotropic pitch.

In contrast, in a comparative simulation, where the petroleum feedstock having the properties in Table 1 is introduced directly to dweller 160 produces a pitch stream having the properties shown in Table 4. The yield of pitch from the petroleum feedstock was about 21 wt %.

TABLE 4

| Properties of pitch from comparative example | |
|---|---|
| Property | |
| Specific Gravity | 1.04 |
| Softening Point (° C.) | 142 |
| Quinoline Insoluble (wt %) | 12 |
| Benzene Insoluble (wt %) | 27 |
| Hydrogen content (wt %) | 5.1 |
| Hydrogen to Carbon ratio (mol/mol) | 0.73 |
| Sulfur content (wt %) | 1.32 |

The pitch with properties as shown in Table 4 was introduced to a mesophase pitch production unit to be converted to anisotropic pitch. The comparative process to produce pitch directly in a dweller produces 38% anisotropic pitch.

Thus, the process to produce pitch with supercritical water results in a higher yield of anisotropic pitch. Additionally, as can be seen in comparing Table 3 and Table 4, the pitch produced in the process to produce pitch with supercritical water produces a higher quality pitch.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made here.

As used here and in the appended claims, the words "comprise," "has," and "include" and all grammatical variations thereof are each intended to have an open, non-limiting meaning that does not exclude additional elements or steps.

That which is claimed is:

1. A process to produce pitch, the process comprising the steps of:
   increasing a pressure of a petroleum feedstock in a petroleum pump to produce a pressurized feedstock, wherein the pressure of the pressurized feedstock is between 23 MP and 30 MPa;
   increasing a temperature of the pressurized feedstock in a petroleum pre-heater to produce a hot feedstock, wherein the temperature of the hot feedstock is between 50° C. and 250° C.;
   increasing a pressure of a water feed in a water pump to produce a pressurized water feed, wherein the pressure of the pressurized water feed is between 23 MPa and 30 MPa;
   increasing a temperature of the pressurized water feed in a water pre-heater to produce a supercritical feed, wherein the temperature of the supercritical water feed is between 374° C. and 600° C.;
   mixing the hot feedstock and the supercritical water feed in a mixer to produce a mixed feed, wherein the volumetric ratio of the volumetric flow rate of the supercritical water feed at standard temperature and pressure (SATP) to the volumetric flow rate of the hot feedstock at SATP is in the range between 4:1 to 1:4;
   introducing the mixed feed to a supercritical reactor;
   operating the supercritical reactor at a reaction temperature between 380° C. and 600° C. and a reaction pressure between 23 MPa and 28 MPa to produce an effluent;
   reducing a temperature of the effluent in a cooling device to produce a cooled effluent, wherein the cooled effluent is at a temperature of less than 250° C.;
   reducing a pressure of the cooled effluent in a depressurizing device to produce a depressurized effluent, wherein depressurized effluent is at a pressure in the range between 10 psig and 550 psig;
   introducing the depressurized effluent to a flash column;
   separating the depressurized effluent in the flash column to produce a vapor product and a liquid product;
   introducing the vapor product into a phase separator;
   separating the vapor product in the phase separator to produce a light oil stream, a water product, and a gas product;
   separating an oil slip stream from the light oil stream;
   mixing the oil slip stream with the liquid product to produce a mixed dweller feed;
   introducing the mixed dweller feed to the dweller;
   introducing an inert gas stream to the dweller, wherein the inert gas stream comprises nitrogen;
   operating the dweller at a temperature between 350° C. and 500° C., a pressure between 0.1 psig and 10 psig, and a residence time between 30 minutes and 4 hours to produce a pitch stream and a reaction gas stream, wherein the dweller is a continuous stirred tank reactor (CSTR), wherein dehydrogenative polymerization reactions occur in the dweller to produce pitch, wherein the inert gas stream is operable to remove volatile components from the mixed dweller feed;
   removing a pitch stream from the dweller, wherein the pitch stream comprises the pitch, wherein the pitch is isotropic pitch; and
   removing a reaction gas stream, wherein the reaction gas stream comprises the volatile components and nitrogen.

2. The process of claim 1, wherein the volatile components comprise volatile hydrocarbons.

3. The process of claim 1, wherein the liquid product comprises less than 1 wt % water.

* * * * *